Figure 1:
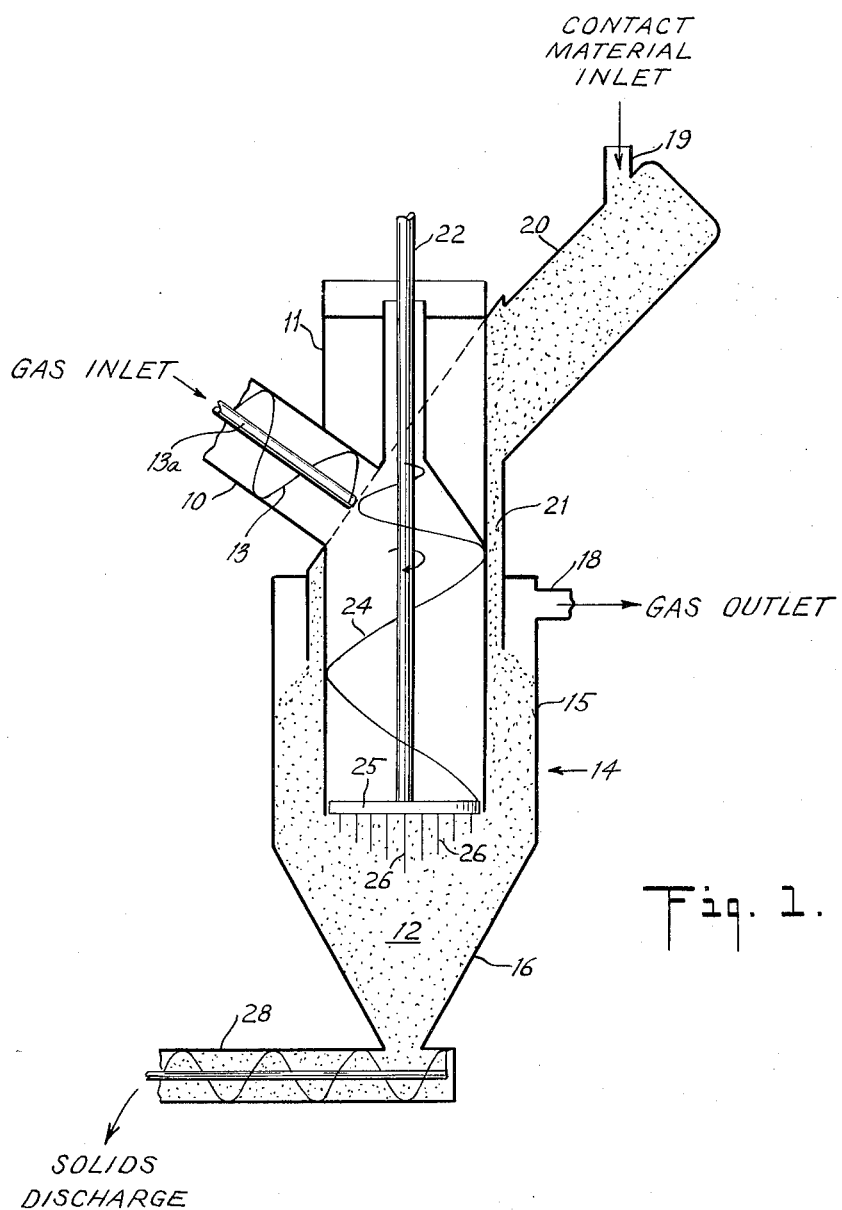

INVENTOR.
HENRY JAMES HOWIE

Nov. 30, 1965 H. J. HOWIE 3,220,165
METHOD FOR REMOVING ENTRAINED SOLIDS FROM A GASEOUS STREAM
Filed Dec. 27, 1961 2 Sheets-Sheet 2

INVENTOR.
HENRY JAMES HOWIE
BY
Robert S. Dunham
ATTORNEY

United States Patent Office

3,220,165
Patented Nov. 30, 1965

3,220,165
METHOD FOR REMOVING ENTRAINED SOLIDS
FROM A GASEOUS STREAM
Henry J. Howie, Arvida, Quebec, Canada, assignor to
Aluminium Laboratories Limited, Montreal, Quebec,
Canada, a corporation of Canada
Filed Dec. 27, 1961, Ser. No. 162,364
5 Claims. (Cl. 55—71)

This invention relates to a method for removing entrained solid materials from a gaseous stream. In accordance with one embodiment this invention relates to a method for the removal of entrained solid materials from a hot, gaseous stream containing an aluminum trihalide, such as aluminum trichloride.

In many chemical processing operations and material handling operations there are produced gaseous streams containing solid materials, usually in the form of fine, dust-like particles, entrained therein. Various means have been suggested heretofore for removing these entrained solids. For example, dust collectors in the form of bags have been employed. Electrostatic precipitators have also been employed. Scrubbing operations wherein the gaseous stream containing the solid materials are sprayed or scrubbed with a suitable liquid solids-entraining agent have also been employed.

Generally, these various types of operations and equipment have not been completely satisfactory. Operating difficulties frequently arise due to the temperature and corrosive nature of the gaseous stream and the solid materials therein. In some instances the solids upon capture tend to plug, or at least reduce, the permeability of the filtering agent or capturing agent with the result that the solids removal operation soon fails.

In the refining of aluminum by the so-called subhalide or catalytic process, aluminum-containing metal is contacted with a hot, gaseous stream of an aluminum trihalide, such as aluminum trichloride, at a high temperature, such as a temperature of about 1200° C. and higher. Reaction takes place between the aluminum in the aluminum-containing metal and the gaseous trihalide with the resulting formation of the corresponding gaseous aluminum monohalide, e.g., aluminum monochloride. As aluminum is extracted from the aluminum-containing metal undergoing treatment the resulting formed gaseous aluminum monohalide, usually present along with unreacted gaseous aluminum trihalide, is cooled to effect dissociation of the aluminum monohalide with the formation of aluminum metal and the corresponding aluminum trihalide. The dissociation reaction is usually carried out in a decomposer wherein the temperature of the gaseous aluminum monohalide is reduced from about 1200° C. to about 700–800° C. or lower. This reduction in temperature causes the gaseous aluminum monohalide to form elemental aluminum and additional gaseous aluminum trihalide. The thus-formed gaseous aluminum trihalide, together with any excess gaseous aluminum trihalide supplied to the decomposer along with the aluminum monohalide, is recovered and returned to the refining operation to contact additional aluminum-containing metal for recovery of aluminum therefrom.

Desirably, the off-gases from the decomposer should be treated to remove therefrom any entrained solid materials before returning the aluminum trihalide-containing off-gases to the refining operation. As recovered directly from the decomposer the off-gases usually have the following composition: gaseous aluminum trihalide, e.g., aluminum trichloride, about 90% by volume; hydrogen, about 10% by volume. These gases contain entrained therein very small amounts of solid materials, such as aluminum formed from the decomposition of aluminum monohalide, e.g., aluminum formed from the decomposition of aluminum monochloride; calcium halide, e.g., calcium chloride; magnesium halide, e.g., magnesium chloride; and other halides, e.g., chlorides, in addition to alumina, aluminum carbide and mixed halide, e.g., chloride, salts of aluminum, sodium, calcium and magnesium. Usually, the temperature of the off-gases upon leaving the decomposer is in the range of 200–700° C., more or less, e.g., a temperature in the range 250–350° C. The temperature of the off-gases affects the amount and the state of the mixed halide salts collected.

It is an object of this invention to provide an improved method for removal of entrained materials from gaseous streams.

It is another object of this invention to provide an improved method for the recovery of entrained solid materials from relatively high temperature, corrosive gaseous streams.

Another object of this invention is to provide an improved, simple, rugged and effective method for the removal of solid materials from relatively hot gaseous streams comprising a gaseous aluminum trihalide, such as aluminum trichloride.

Still another object of this invention is to provide an improved method for the recovery of solid materials from the off-gases of the decomposer employed in the subhalide or catalytic method for the refining of aluminum.

Yet another object of this invention is to provide a method for the removal of entrained solid materials from a gaseous stream wherein the solids-carrying gaseous stream is passed through a permeable bed or mass of particle-form, inert solid materials.

Figure 2:
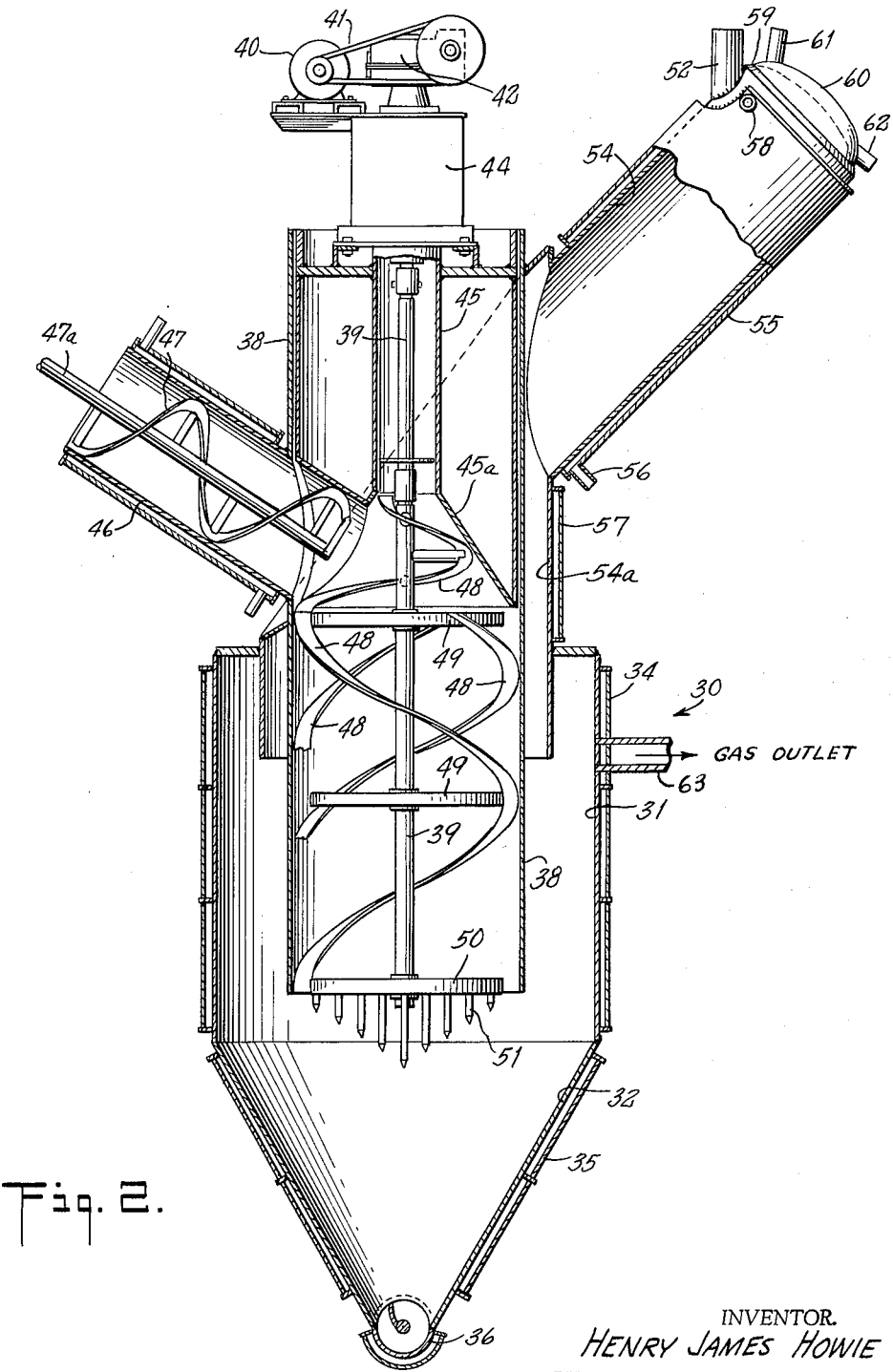

How these and other objects of this invention are accomplished will become apparent in the light of the accompanying disclosure made with reference to the accompanying drawings wherein:

FIG. 1 schematically illustrates the method and apparatus in accordance with this invention for the removal of entrained solid materials from a gaseous stream; and wherein FIG. 2 is a partial cross-sectional view of apparatus useful in carrying out the process of this invention.

In accordance with this invention there is provided a method whereby solid materials entrained in a gaseous stream are removed therefrom by means of a permeable, downwardly moving, compact mass of inert, solid, particle-form contact material. As a result of the contacting operation there is recovered a treated gaseous stream substantially free of entrained solids. The solid material, together with any liquid material in droplet form, originally entrained in the gaseous stream is removed therefrom by means of the downwardly moving mass of contact material and is entrapped therein. The contact material containing the entrapped solids is separately recovered for disposal or for further treatment, if desired, such as recovery of the entrapped solids, to realize their value and/or for the return of the substantially solids-free, particle-form contact material to the solids removal operation to contact additional gaseous stream.

More particularly, in accordance with this invention, a gaseous stream containing solids entrapped therein is introduced within a downwardly moving permeable mass of particle-form, inert contact material. The gaseous stream is introduced directly within the downwardly moving mass of contact material such that as the mass of contact material moves downwardly within the contacting zone it carries with it the entrapped solids. As the gas is introduced within the downwardly moving mass of contact material it initially flows downwardly therethrough and then upwardly through the upper, annular portion of the mass of contact material in a substantially solids-free condition. The contacting operation for solids removal is carried out such that the solids-containing gaseous stream upon initial contact with the downwardly moving permeable mass of contact material flow concurrently therewith and then countercurrently therewith so that as the contact material, now containing entrapped solids, is removed from the lower end of the contacting or filtering zone there is recovered from the upper end of the contacting-filtering zone a gaseous stream substantially free of solids.

The contact material at the gas inlet takes the form of an inwardly sloping cone with its angle to the horizontal essentially that of the angle of repose of the contact material, about 40°. A mechanical rake is employed to assist the uniform flow of contact material from the bottom and around the circumference of the contact material feed annulus. Additionally, the mechanical rake stirs and agitates the contact material in the cone, exposing fresh surfaces, and disintegrates lumps or layers of the entrapped or separated solids. In operation the rake tends to flatten the cone within the contact material, reducing the cone angle between 0–40° to the horizontal.

The contact material employed in the contacting or filtering operation is any suitable material which is inert, or substantially inert, with respect to the solids to be removed and/or the gaseous stream undergoing treatment. Particle-form coke, such as calcined petroleum coke, is particularly useful as a solid contact material since it is relatively cheap, usually readily available, refractory and substantially inert to very many gaseous materials. Other inert, preferably refractory, solid contact materials might also be employed.

The particle-form contact material employed in the filtering mass for the removal of the solids from the gas stream may have any suitable particle size convenient for handling and effective for the removal of the entrained solids. In the particular application of the practice of this invention to the recovery of solids from decomposer off-gases in the subhalide process for the refining of aluminum, it is preferred to use particle-form coke having a particle size in the range smaller than 4 mesh but larger than 14 mesh, such as coke having a particle-size in the range (−4+8) mesh. The particle size of the contact material, however, must not be such that it is entrained or fluidized by the gaseous stream flowing therethrough. Also, desirably, the particle size of the contact material should be such that the resulting mass of contact material is readily permeable and does not present an undue pressure drop due to the flow of gases therethrough.

In the recovery of solids from decomposer off-gases the particle size of the contact material employed in the filtering zone should be such that the pressure drop due to the flow of off-gases therethrough does not substantially exceed about 10 mm. Hg. The pressure drop of the gaseous stream as it flows through the filtering zone in contact with the mass of particle-form contact material therein should not be a significant part of the total system pressure drop. In most instances such a result is readily afforded wherein the particle size of the contact material is in the range from about 2″ in diameter to about 0.12″ in diameter.

Referring now to the drawings, particularly to FIG. 1 thereof which schematically illustrates the practice, and apparatus for carrying out the practice, of this invention, a gaseous stream from a suitable source, such as a furnace or the off-gases from the decomposer in the subhalide process for the refining of aluminum, containing entrained solid materials, is supplied via conduit-inlet 10 to substantially upright cylindrical tube or conduit 11 for introduction of the gases into the central portion of a mass of solid contact material 12 provided within contactor-filter generally indicated by the reference numeral 14. Ribbon scraper 13 fixed on rotatable shaft 13a is provided within and along the length of inlet 10 to scrape the surfaces thereof in contact with the solids-containing gaseous stream flowing therethrough to prevent the accumulation of solids on these surfaces. Contactor 14 is a vessel provided with an upper cylindrical portion 15 and a lower conical portion 16. Gas outlet 18 is provided in the upper portion of contactor 14 for the withdrawal of the treated or filtered solids-free gases therefrom. Suitable particle-form contact material is supplied through inlet 19 of conduit 20 for the supply of the particle-form contact material to the upper end of cylindrical portion 15 of contactor 14. The contact material is supplied via conduit 20 down through annular passageway 21 which surrounds the exterior of conduit 11 at that portion thereof within and about the upper end of cylindrical portion 15 of contactor 14. The slope of conduit 20 and the top of feed annulus or passageway 21 should be at some angle to the horizontal greater than the angle of repose of the contact material therein to insure that the feed annulus remains full of the contact material. For example, in the instance where the angle of repose of the contact material is about 40°, desirably conduit 20 is inclined at an angle of about 45° and the top of the feed annlus inclined at an angle of 55°.

Shaft 22 extending the length of conduit 11, centrally positioned therein and preferably coaxial with respect to contactor 14, has fixed along the length thereof ribbon scraper 24. The lower end of shaft 22 at about the bottom of conduit 11 within contactor 14 is provided with a horizontal rabble arm 25. Rabble arm 25 has prongs or finger-like projections 26 fixed thereto. Projections 26 extend downwardly from rabble arm 25 into mass 12 of contact material within contactor 14.

The bottom of conical portion 16 of contactor 14 communicates with screw conveyor 28 which serves to discharge and to remove contact material containing solids entrapped therein from the lower end of contactor 14 for subsequent treatment or disposal.

In accordance with the practice of this invention a solids-containing gaseous stream is introduced via inlet 10 into central conduit 11 into contact with mass 12 of contact material within vessel 14. The contact material is supplied to vessel 14 via inlet 19, conduit 20 and annular passageway 21 surrounding conduit 11 within the upper cylindrical portion of contactor 14. Contact material containing entrapped solids is discharge from the lower end of contactor 14 by means of screw conveyor 28.

As the solids-contaminated gas stream is introduced via inlet 10 into contact with mass 12 within contactor 14, resulting treated gas, now substantially free of solids, is withdrawn from the upper end of vessel 14 via conduit 18. Fresh contact material is continuously supplied to the upper end of contactor 14 via inlet 19, conduit 20 and annular passageway 21 and resulting dirty, contact material, now containing solids entrapped therein, is removed from the bottom of contactor 14 by means of screw conveyor 28. It is thus seen that there is provided within contactor 14 a downwardly moving, contiguous and compact mass of solid contact material. It is also seen that the solids-contaminated gas stream supplied via inlet 10 initially and for a short period of time contacts mass 12 of the contact material within contactor 14 in a concurrent direction and then moves upwardly within contactor 14 within the relatively large annular space between cylinder 11 and upper cylindrical portion 15 of contactor 14 in a direction countercurrent with respect to the flow of contact material therein.

Also, as indicated in FIG. 1, upon rotation of shaft 22 ribbon scraper 24 serves to scrape off or remove any adhering solid materials from the interior of cylindrical conduit 11 in contact with the solids-contaminated gaseous stream undergoing treatment. Also, as indicated therein, upon rotation of shaft 22 rabble arm 25 is caused to rotate thereby causing prongs or fingers 26 to mechanically stir or agitate mass 12 of contact material within contactor 14. By thus continuously moving or agitating the contact material within contactor 14, clean, fresh surfaces of the contact material are continuously exposed to initially contact the solids-contaminated gas stream. This prevents plugging of the mass of contact material, particularly at the point of gas entry, with the resulting entrapped solids.

Referring now to FIG. 2 of the drawings which illustrates in greater detail the countercurrent, compact moving coke bed filter of this invention, as illustrated, the contactor-filter generally indicated by reference numeral 30 comprises an upper cylindrical portion 31 and a lower conical portion 32. Both the upper cylindrical portion 31 and the lower conical portion 32 are provided with jackets 34 and 35, respectively. Suitable hot heat exchange fluid, such as Dowtherm vapor or Dowtherm liquid, is circulated through jackets 34 and 35 to maintain the desired operating temperature within contactor-filter 30. The bottom of lower conical portion 32 is in communication with screw conveyor 36 for removal and discharge of solids-contaminated contact material from contactor-filter 30.

Centrally disposed within contactor-filter 30 is cylindrical gas inlet tube 38 which extends downwardly within the upper cylindrical portion 31 terminating therein at about its juncture with lower conical portion 32. Gas outlet 63 is provided in the upper portion of contactor-filter 30 for the withdrawal of the treated or filtered solids-free gases. Also, shaft 39 is centrally disposed within inlet tube 38 and is adapted for rotation therein by means of motor 40 via drive means 41 through gear reducer 42 which is provided on mounting 44. Shaft 39 within gas inlet tube 38 is surrounded within the upper portion of inlet tube 38 by shroud 45. The bottom portion 45a of shroud 45 is conical in shape at the point of entry of the solids-contaminated gas which is supplied to inlet tube 38 via conduit 46.

Fixed to shaft 39 are ribbon scrapers 48 for rotation with shaft 39 so as to scrape away and remove any solid materials which tend to be deposited on the surface of lower shroud portion 45a in direct contact with the solids-contaminated gases supplied thereto via inlet 46. Ribbon scrapers 48 are fixed to shaft 39 and adapted for rotation therewith by suitable means, such as wheels 49. Ribbon scraper 47 fixed to rotatable shaft 47a is also provided along the length of gas inlet conduit 46 to prevent the accumulation of solids therein.

Rabble arm 50 is fixed to the lower end of shaft 39. Fingers or prongs 51 are fixed to the underside of rabble arm 50 and upon rotation of shaft 39 and rabble arm 50 fingers 51 serve to stir up the mass of contact material present within contactor-filter 30 to assist in its downward movement and to continuously expose fresh surfaces of contact material to the solids contaminated gas initially contacting the solid contact material as the gas flows from the lower end of tube 38.

Solid contact material is supplied to contactor-filter 30 via inlet 52 and supply conduit 54. Supply conduit 54 at its lower portion 54a forms an annular passageway surrounding the upper part of inlet tube 38 and, accordingly, it serves to supply an annular stream of contact material around inlet tube 38 into contactor-filter 30. Supply conduit 54 is provided with jacket 55 along the length thereof, similarly supply conduit 54a is provided with heat exchange jacket 57. Suitable heat exchange fluid is supplied to jacket 55 via inlet 56 for discharge via outlet 58 and means, not shown, are provided for the flow of heat exchange fluid to and from jacket 57. Also, supply conduit 54 is closed at one end with cap 59 which is also provided with jacket 60 and supplied with suitable heat exchange fluid via inlet 62 and for discharge via outlet 61.

Contactor-filter 30 and auxiliary equipment, including inlet supply lines and discharge lines may be made of any suitable material. Mild steel is a suitable material of construction when the contactor-filter is operated at a temperature below about 500° C. When, however, it is desired to operate contactor-filter 30 at a temperature above about 500° C., stainless steel is preferred as the material of construction.

The material removed from contactor-filter 30 via screw conveyor 36 comprising the contact material and the recovered solids originally contaminating the gases supplied via inlet 46 might be treated by a screening operation for the separation of the contact material from the contaminating solids originally present in the gaseous stream undergoing treatment. In the instance wherein the contact material is coke the entire admixture upon removal from the bottom of the contactor-filter might be charged to a sintering furnace or to a reduction furnace used in the preparation of the reduction furnace alloy, particularly in the instance when this invention is applied to the removal of solids from a gaseous aluminum trichloride stream produced in the refining of aluminum from carbothermic aluminum alloy, thus recovering both aluminum and carbon values in the admixture.

Instead of rabble arm 50 and fingers 51 fixed thereto to maintain a conical cavity within the contact material supplied to contactor-filter 30, it is possible to replace these elements with a perforated plate or screen. These devices, however, are less desirable since it would appear that the openings therethrough would become quickly plugged and blocked by the solids in the gases passing therethrough and would result in a relatively short operating life for the contactor-filter.

The following example is further illustrative of the practice of this invention. A full size, commercial prototype of the contactor-filter as illustrated in FIGS. 1 and 2 was built. Three experiments were carried out with conditions as follows: coke size smaller than 4 mesh and larger than 8 mesh; coke flow rate of 36 pounds per hour, air flow rate of 35 cubic feet per minute, carbon dust flow of 5.2 pounds per hour, all the carbon dust being smaller than 325 mesh. The duration of each test was 24 hours and all the tests were carried out at a coke surface stirrer speed of 1 r.p.m. and a water mist rate of 0 pound per hour in test No. 1 and 2.5 pounds per hour in tests Nos. 2 and 3. During the tests the air, dust and water mist were well mixed before initially contacting the coke surface. A cotton bag filter was placed on the gas outlet pipe from the contactor-filter to collect any dust present in the outlet air. The contactor-filter operated successfully in these tests with dust collecting efficiencies ranging from 99.93 to 99.96%.

Another similar moving coke bed filter was built and installed in the gas outlet lines downstream from the aluminum monochloride decomposer employed in a subhalide process unit for the refining of aluminum having a capacity of 100 pounds per hour of refined aluminum. The filter operated successfully and prevented blockages in the gas outlet lines leading from the decomposer. The filter removed 931 pounds of solid materials from 160,000 pounds of decomposer outlet gas circulated and operated at a collection efficiency of essentially 100%.

As will be apparent to those skilled in the art in the light of the foregoing disclosures, many modifications, alterations and substitutions are possible in the practice of this invention without departing from the spirit or scope thereof.

I claim:
1. A method of filtering entrained materials from a gaseous stream which comprises flowing said gaseous stream through a filtering zone, contacting the gaseous stream with a downwardly moving, permeable mass of solid particles of inert material so as to filter the entrained materials from the gaseous stream, mechanically agitating the mass of particles in the portion of the filtering zone wherein occurs initial contact of the gaseous stream with the particles of inert material so as to present freshly exposed surfaces of the particles for said initial contact withdrawing the thus contacted gaseous stream, substantially free of entrained materials, from the upper end of said filtering zone and withdrawing said solid particles of inert material, containing said entrained materials, from the lower end of said filtering zone.

2. A method of filtering entrained materials from a hot, gaseous stream comprising a gaseous aluminum trihalide which comprises flowing said gaseous stream through a filtering zone having an upper end and a lower end, contacting the gaseous stream, with a downwardly-moving, permeable mass of solid particles of inert material so as to filter the entrained materials from the gaseous stream, mechanically agitating the mass of particles of inert material in the portion of the filtering zone wherein occurs initial contact of the gaseous aluminum trihalide stream with the particles of inert material so as to present freshly exposed surfaces of the particles for said initial contact withdrawing gaseous stream comprising gaseous aluminum trihalide, substantially free of entrained materials, from the upper end of said filtering zone and withdrawing solid particles of inert material containing entrained materials from the lower end of said filtering zone.

3. A method of filtering materials from a hot gaseous aluminum trihalide stream which comprises introducing a stream comprising hot gaseous aluminum trihalide containing materials entrained therein into a contacting-filtering zone having an upper end, a lower end and a intermediate portion into said intermediate portion, contacting said gaseous aluminum trihalide stream containing material entrained therein with a downwardly-moving, permeable mass of solid particles of inert refractory material within said contacting-filtering zone so as to filter the entrained materials from the gaseous aluminum trihalide stream, said mass of solid particles of inert refractory material being supplied to the upper end of said contacting-filtering zone and said solid particles of inert refractory material containing solid entrained material being withdrawn from the lower end of said contacting-filtering zone, mechanically agitating said mass of particles of inert refractory material in the portion of the contacting-filtering zone wherein occurs initial contact of the gaseous aluminum trihalide stream with the particles of inert refractory material so as to present freshly exposed surfaces of the particles for said initial contact and separately withdrawing gaseous aluminum trihalide, substantially free of entrained materials, from about the upper end of said contacting-filtering zone.

4. A method of filtering entrained materials from a gaseous aluminum trihalide stream which comprises providing a permeable, compact mass solid articles of inert, contact material, said mass of contact material being disposed within a filtering zone to provide an upper annular portion and a lower body portion contiguous thereto, said lower body portion presenting freshly exposed surfaces of the particles of said contact material for initial contact with said gaseous aluminum trihalide stream, supplying said solid particles of contact material to the top of said upper annular portion, introducing said gaseous aluminum trihalide stream into said lower body portion of said mass of contact material for initial contact with the freshly exposed surface thereof, flowing said gaseous aluminum trihalide stream downwardly through the lower body portion and upwardly through the upper annular portion of said mass of contact material so as to filter the entrained materials from the gaseous aluminum trihalide stream, withdrawing contact material from the bottom of said lower body portion of said mass of contact material containing entrained material and separately withdrawing gaseous aluminum trihalide from the upper end of said annular portion.

5. A method of filtering entrained materials from a gaseous stream comprising:
  (a) providing a substantially cylindrical vessel having an upwardly opening conical lower portion, a conduit disposed centrally within the vessel, the lower end of the conduit terminating at about the top of the conical portion and the upper end of the conduit extending above the vessel, and an annular jacket surrounding a portion of the conduit within the cylindrical portion of the vessel;
  (b) supplying a permeable compact mass of downwardly moving solid particles of inert material to the annular jacket and withdrawing the mass of particles from the bottom of the conical portion;
  (c) flowing the gaseous stream through the conduit, from the lower end of the conduit downwardly through the permeable mass of particles in the conical portion and upwardly through the permeable mass of particles in the annular jacket so as to filter the entrained materials from the gaseous stream;
  (d) withdrawing the gaseous stream from the upper end of the vessel; and
  (e) mechanically agitating the mass of particles in proximity to the lower end of the conduit so that freshly exposed surfaces of the particles initially contact the gaseous stream as it enters the vessel.

References Cited by the Examiner

UNITED STATES PATENTS

| 620,925 | 3/1899 | Hirt | 55—98 |
|---|---|---|---|
| 1,464,113 | 8/1923 | Ryding | 55—261 |
| 2,400,645 | 5/1946 | Huff | 55—98 |
| 2,580,635 | 1/1952 | Winter | 55—72 |
| 2,685,388 | 8/1954 | Steiner | 34—168 |
| 2,701,623 | 2/1955 | Schubert | 55—99 |
| 2,728,995 | 1/1956 | Schaub | 34—168 |
| 2,781,255 | 2/1957 | Krivsky | 75—25 |
| 2,849,293 | 8/1958 | Wendell et al. | 23—92 |
| 2,897,918 | 8/1959 | Schlothauer et al. | 55—72 |
| 2,900,256 | 8/1959 | Scott | 34—210 |
| 2,911,730 | 11/1959 | Schaub et al. | 34—168 |

FOREIGN PATENTS

| 635,082 | 9/1936 | Germany. |
|---|---|---|
| 658,876 | 4/1938 | Germany. |
| 685,495 | 1/1953 | Great Britain. |
| 879,216 | 4/1961 | Great Britain. |

REUBEN FRIEDMAN, *Primary Examiner.*

UNITED STATES PATENT OFFICE
CERTIFICATE OF CORRECTION

Patent No. 3,220,165                          November 30, 1965

Henry J. Howie

It is hereby certified that error appears in the above numbered patent requiring correction and that the said Letters Patent should read as corrected below.

Column 7, line 47, for "articles" read -- particles --; column 8, line 47, for "Krivsky" read -- Krivsky et al. --; line 57, for "4/1961" read -- 10/1961 --.

Signed and sealed this 6th day of December 1966.

(SEAL)

Attest:

ERNEST W. SWIDER                                   EDWARD J. BRENNER

Attesting Officer                                              Commissioner of Patents